United States Patent
Nolke et al.

(10) Patent No.: US 9,593,729 B2
(45) Date of Patent: Mar. 14, 2017

(54) BRAKE ASSEMBLY HAVING SLACK ADJUSTMENT MECHANISM

(71) Applicant: Caterpillar Inc., Peoria, IL (US)

(72) Inventors: Josh Nolke, Franklin, WI (US); Mirko Barbir, Naperville, IL (US); John Gates, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 29 days.

(21) Appl. No.: 14/696,509

(22) Filed: Apr. 27, 2015

(65) Prior Publication Data

US 2016/0312845 A1    Oct. 27, 2016

(51) Int. Cl.
| | |
|---|---|
| F16D 65/54 | (2006.01) |
| F16D 65/74 | (2006.01) |
| F16D 121/02 | (2012.01) |
| F16D 65/18 | (2006.01) |
| F16D 55/40 | (2006.01) |

(52) U.S. Cl.
CPC .............. *F16D 65/74* (2013.01); *F16D 55/40* (2013.01); *F16D 65/18* (2013.01); *F16D 65/54* (2013.01); *F16D 65/543* (2013.01); *F16D 2121/02* (2013.01)

(58) Field of Classification Search
CPC ........ F16D 55/40; F16D 65/54; F16D 65/543; F16D 65/18; F16D 2121/02
USPC ............................ 188/71.7, 71.8, 79.51, 214
See application file for complete search history.

(56) References Cited

U.S. PATENT DOCUMENTS

| | | | | |
|---|---|---|---|---|
| 2,551,251 A | * | 5/1951 | Du Bois | F16D 65/54 188/71.8 |
| 2,830,680 A | * | 4/1958 | Hawley | F16D 65/54 188/152 |
| 3,574,324 A | * | 4/1971 | Kellogg | F16D 65/18 188/196 P |
| 3,613,849 A | * | 10/1971 | Pape | F16D 13/757 188/196 P |
| 3,995,722 A | | 12/1976 | Jones et al. | |
| 4,050,548 A | * | 9/1977 | Margetts | F16D 65/54 188/196 P |
| 4,192,407 A | | 3/1980 | Crossman | |
| 4,345,674 A | * | 8/1982 | Vacval | F16D 65/18 188/196 P |
| 4,712,654 A | * | 12/1987 | Temple | F16D 65/18 188/196 P |

(Continued)

FOREIGN PATENT DOCUMENTS

WO    2013108447    7/2013

*Primary Examiner* — Thomas Irvin
(74) *Attorney, Agent, or Firm* — Derek J. Sornogy

(57) ABSTRACT

A brake assembly includes a housing, a brake element configured to be operatively associated with an axle for resisting rotation of the axle, and a piston configured to be selectively moved into and out of braking engagement with the brake element. The brake assembly further includes a slack adjustment mechanism for limiting movement of the piston when the piston is moved out of braking engagement with the brake element. The slack adjustment mechanism includes a shuttle configured to be engaged by the piston, and a plurality of stop elements carried by the shuttle and configured to be moved off the shuttle into a well of the housing. Movement of the piston is stopped when the shuttle engages an end wall of the well or one of the stop elements in the well.

15 Claims, 7 Drawing Sheets

(56) References Cited

U.S. PATENT DOCUMENTS

| | | | |
|---|---|---|---|
| 5,186,284 A * | 2/1993 | Lamela | F16D 55/36 |
| | | | 188/1.11 R |
| 5,607,033 A | 3/1997 | Naedler et al. | |
| 5,628,387 A | 5/1997 | Schantzen | |
| 8,893,860 B2 * | 11/2014 | Ohnogi | F16D 55/40 |
| | | | 188/71.5 |
| 2010/0012440 A1 * | 1/2010 | Vu | F16D 65/186 |
| | | | 188/72.3 |
| 2014/0112747 A1 * | 4/2014 | Ohnogi | F16D 55/40 |
| | | | 414/685 |

* cited by examiner

BRAKE ASSEMBLY HAVING SLACK ADJUSTMENT MECHANISM

TECHNICAL FIELD

This disclosure relates to brake assemblies for slowing the rotation of an axle. More particularly, this disclosure relates to slack adjustment mechanisms for such brake assemblies.

BACKGROUND

The rotation of an axle, such as an axle of a machine, can be slowed using a brake assembly. A common brake assembly configuration includes a brake element and a piston that engages the brake element to create a braking force. The brake element may wear with use, and this may change the performance of the brake assembly. In particular, as a brake element wears, the distance that a piston must travel to engage the brake element may increase, and this change may be perceptible by an operator.

Slack adjustment mechanisms have been introduced in brake assemblies to limit the movement of a piston as the piston is moved out of engagement with the brake element. For example, U.S. Pat. No. 3,995,722 discloses a slack adjustment mechanism that includes a one-way clutch that allows movement of a piston in an engagement direction, but limits movement of the piston away from the engagement direction.

A need exists, however, for further developments relating to brake assemblies and slack adjustment mechanisms.

SUMMARY OF THE INVENTION

According to one aspect of this disclosure, a brake assembly is provided and includes a housing, a brake element configured to be operatively associated with an axle for resisting rotation of the axle, and a piston configured to be selectively moved into and out of braking engagement with the brake element. The brake assembly further includes a slack adjustment mechanism for limiting movement of the piston when the piston is moved out of braking engagement with the brake element. The slack adjustment mechanism includes a shuttle configured to be engaged by the piston, and a plurality of stop elements carried by the shuttle and configured to be moved off the shuttle into a well of the housing. Movement of the piston is stopped when the shuttle engages an end wall of the well or one of the stop elements in the well.

According to another aspect of this disclosure, a machine is provided and includes a frame, an axle operatively connected to the frame and configured to rotate, and a brake assembly operatively associated with the axle. The brake assembly includes a housing, a brake element configured to resist rotation of the axle, and a piston configured to be selectively moved into and out of braking engagement with the brake element. The brake assembly further includes a slack adjustment mechanism for limiting movement of the piston when the piston is moved out of braking engagement with the brake element. The slack adjustment mechanism includes a shuttle configured to be engaged by the piston, and a plurality of stop elements carried by the shuttle and configured to be moved off the shuttle into a well of the housing. Movement of the piston is stopped when the shuttle engages an end wall of the well or one of the stop elements in the well.

According to yet another aspect of this disclosure, a slack adjustment mechanism is provided and includes a shuttle having at least one flange, a plurality of stop elements carried by the shuttle and configured to be moved off the shuttle, and a cap having a shoulder configured to be engaged by the at least one flange and to move one or more of the stop elements off the shuttle.

DETAILED DESCRIPTION

Figure 1:
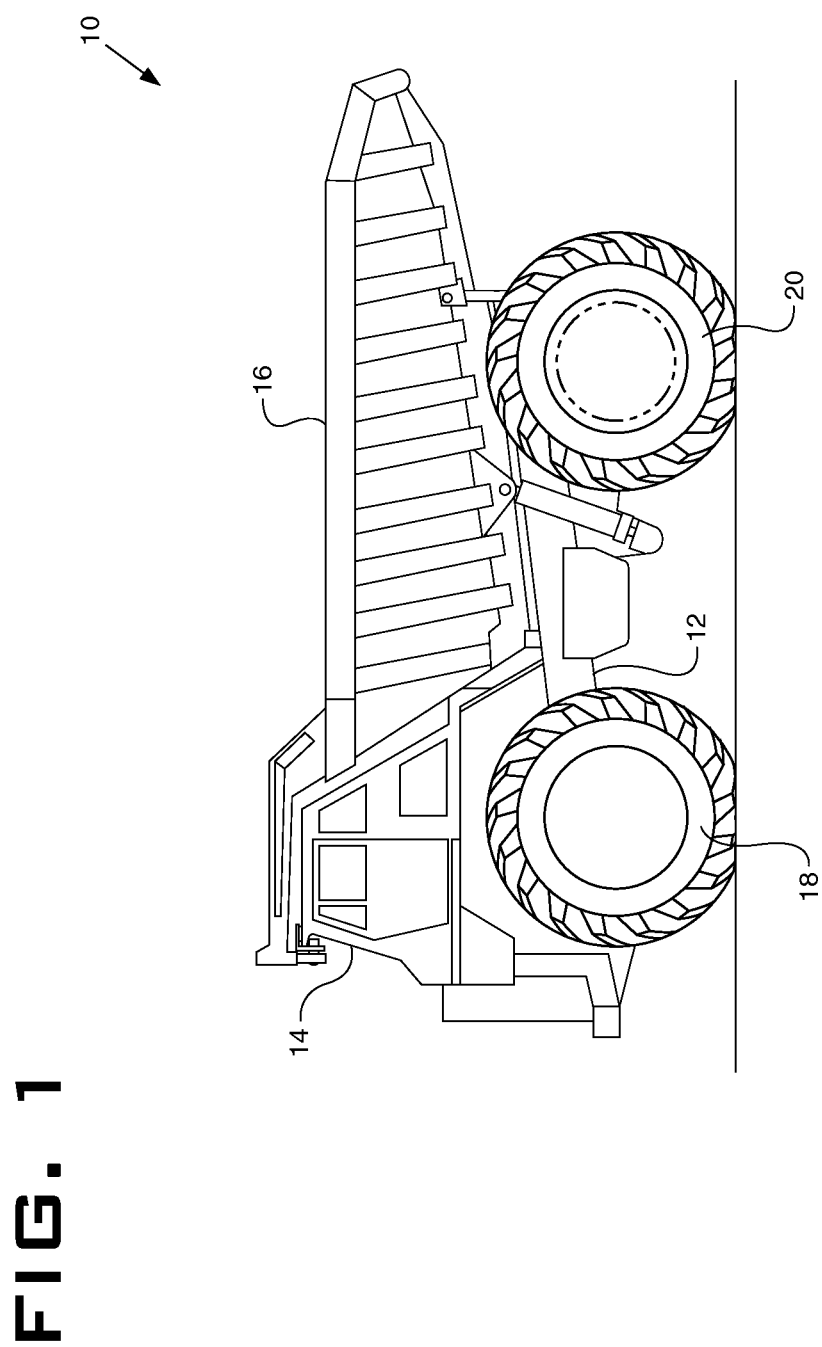
FIG. 1 is a side elevation view showing a machine.

Referring to the figures, and beginning with FIG. 1, a machine 10 is shown. The machine 10 is in the form of a large truck, but it will be appreciated that this disclosure is generally applicable to other types of machines, as well.

The machine 10 generally includes a frame 12, an operator cab 14, and a bed 16. Ground engaging members, including front wheels 18 and rear wheels 20, are provided for moving the machine 10 along a ground surface. The machine 10 also includes a power source, such as an engine (not shown).

Figure 2:
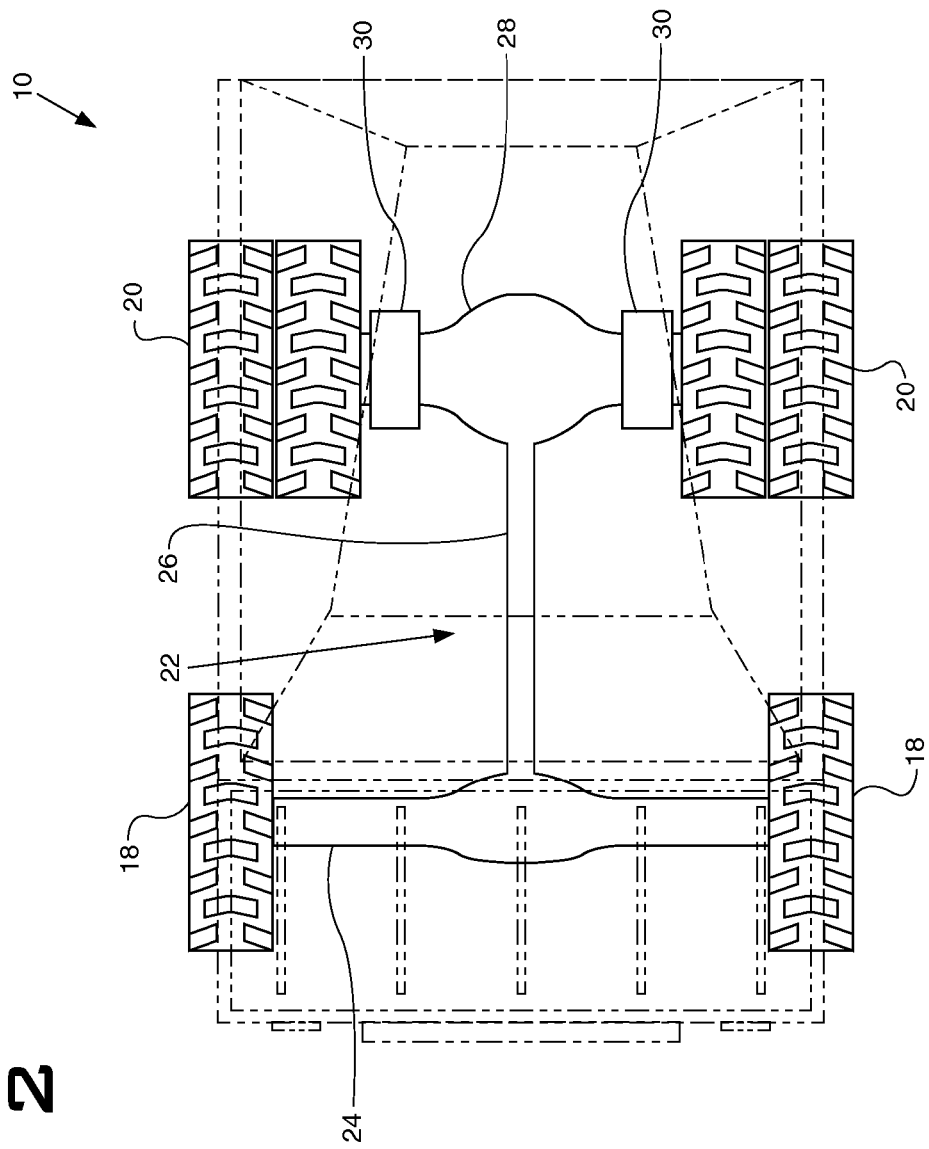
FIG. 2 is a schematic depiction of a drivetrain of the machine of FIG. 1, including an axle and brake assemblies operatively associated with the axle.

Referring next to FIG. 2, features of a drivetrain 22 of the machine 10 are shown. The drivetrain 22 generally includes a front axle 24, a drive shaft 26, and a rear axle 28, with the front and rear axles 24, 28 being operatively connected to the frame 12 and configured to rotate. The drivetrain 22 provides rotational power from the machine's power source to the front wheels 18 and/or rear wheels 20. In some embodiments, either the front axle 24 or rear axle 28 may be a dead axle, which is free to rotate but does not receive rotational power from the machine's power source.

The front axle 24 is operatively connected with the front wheels 18, while the rear axle 28 is operatively connected with the rear wheels 20. Rotation of the front and rear axles 24, 28 corresponds with rotation of the front and rear wheels 18, 20. The front and rear axles 24, 28 may be split into half axles for the left and right sides of the machine 10, respectively. For example, the front-left wheel 18 may be configured to rotate independently of the front-right wheel 18, and the rear-left wheel 20 may be configured to rotate independently of the rear-right wheel 20.

Brake assemblies 30 are operatively associated with the rear axle 28 for resisting the rotation thereof, which can serve to slow or stop the movement of the rear wheels 20. For example, and as shown, a brake assembly 30 is operatively associated with the components of the rear axle 28 connected with the rear-left wheel 20, while another brake assembly 30 is operatively associated with the components of the rear axle 28 connected with the rear-right wheel 20. The brake assemblies 30 are substantially similar, and the description of one applies to the other. Optionally, a single brake assembly 30 may be provided for the rear axle 28.

Figure 3:
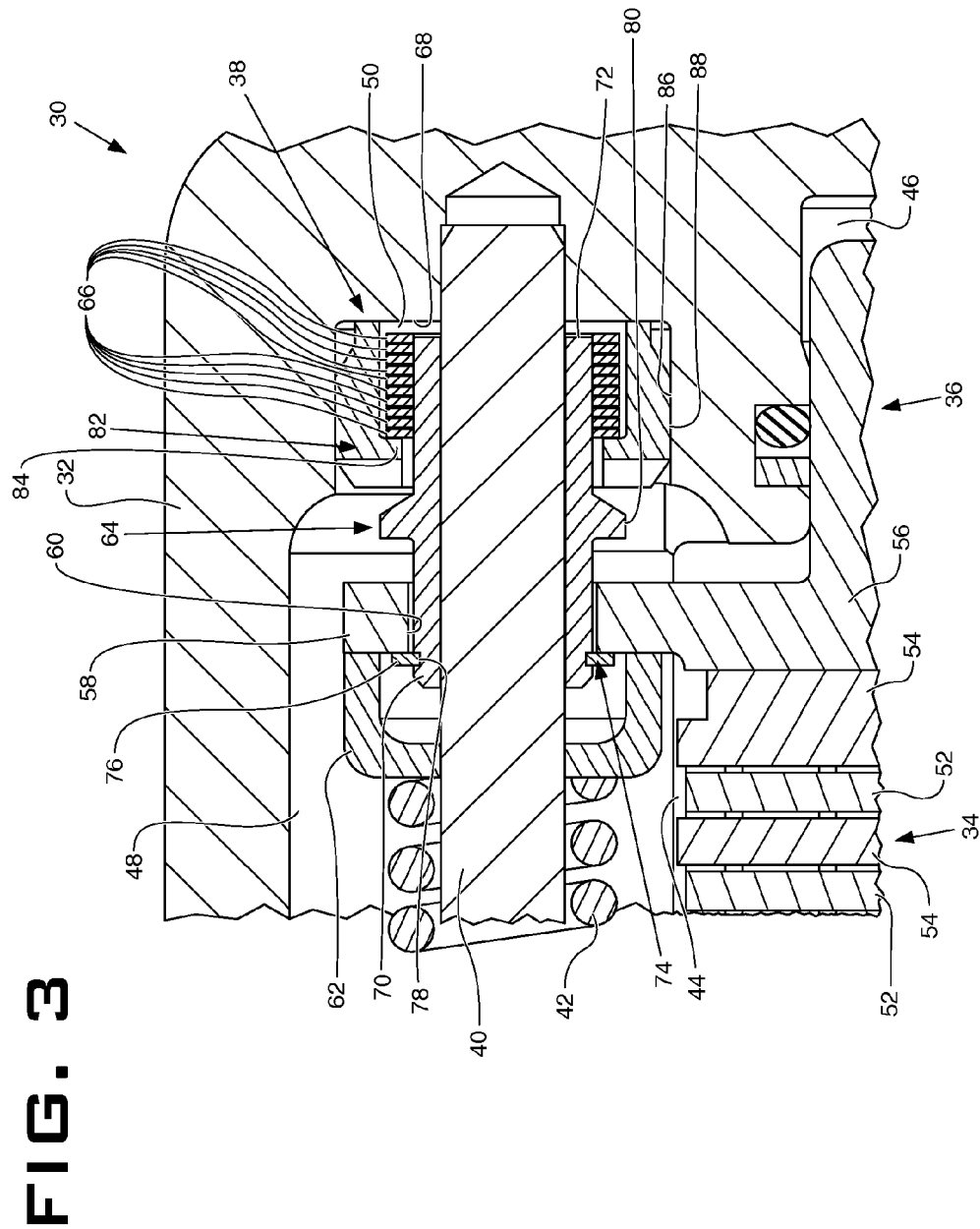
FIG. 3 is a cross-section view showing a portion of a brake assembly of FIG. 2, and with a piston in braking engagement with a brake element.

Referring next to FIG. 3, features of a brake assembly 30 are shown. The brake assembly 30 generally includes a housing 32, a brake element 34, a piston 36, a slack adjustment mechanism 38, a guide rod 40, and a retract spring 42.

The housing 32 encloses some or all of the components of the brake assembly 30, and generally defines several internal spaces, including: a first space 44, a second space 46, a third space 48, and a well 50. The brake element 34 is generally positioned in the first space 44, and the second space 46 is generally opposite the piston 36 from the first space 44. The guide rod 40 and retract spring 42 extend in the third space 48, and the slack adjustment mechanism 38 is partially positioned within the well 50. The guide rod 40 also extends in the well 50.

The brake element 34 is operatively associated with the rear axle 28 for resisting the rotation thereof. Thereby, the brake element 34 is used to slow or stop the rotation of a rear wheel 20. In the embodiment shown, the brake element 34 includes a plurality of brake discs 52 and spacer plates 54. The brake discs 52 may configured to rotate with the rear axle 28, while the spacer plates 54 may be configured to not rotate relative to the rear axle 28. For example, the brake discs 52 may be fixed in rotation with respect to the rear axle 28, which the spacer plates 54 may be fixed in rotation with respect to the housing 32. The brake assembly 30 may be a wet brake design, whereby braking oil surrounds components of the brake assembly 30, including the brake element 34.

The piston 36 is configured to be selectively moved into and out of braking engagement with the brake element 34. When the piston 36 is moved into braking engagement with the brake element 34, the brake element 34 resists rotation of the rear axle 28. In particular, when the piston 36 is moved into braking engagement, the brake discs 52 and spacer plates 54 are pressed closer to each other, which resists rotation of the rear axle 28. When the piston 36 is moved out of braking engagement with the brake element 34, the brake element 34 does not resist, or substantially does not resist, rotation of the rear axle 28.

The piston 36 generally includes a first portion 56 and a second portion 58. The first portion 56 is configured to engage the brake element 34. In particular, pressurized fluid is introduced into the second space 46 of the housing 32 and the piston 36 is moved toward the brake element 34. The first portion 56 engages the brake element 34, pressing the brake discs 52 and spacer plates 54 together. When the piston 36 is moved out of braking engagement with the brake element 34, the first portion 56 is moved away from the brake element 34 such that the first portion 56 no longer presses the brake discs 52 and spacer plates 54 together. The first portion 56 generally moves in the first space 44 of the housing 32.

The second portion 58 of the piston 36 extends from the first portion 56 and includes a bore 60. The guide rod 40 extends through the bore 60. Thereby, the piston 36 is generally moveable along the guide rod 40. The piston 36 also includes an extension member 62 that extends from the second portion 58 along a length of the guide rod 40 away from the well 50 of the housing 32. The retract spring 42 fits over the guide rod 40 and engages the extension member 62 distal from the bore 60. The retract spring thereby engages the second portion 58 so as to move the piston 36 out of braking engagement with the brake element 34. The second portion 58 generally moves in the third space 48 of the housing 32.

The slack adjustment mechanism 38 is for limiting movement of the piston 36 when the piston 36 is moved out of braking engagement with the brake element 34. The slack adjustment mechanism 38 generally includes a shuttle 64, and a plurality of stop elements 66 that are carried by the shuttle 64, but are configured to be moved off the shuttle 64 into the well 50 of the housing 32. Movement of the piston 36 is stopped when the shuttle 64 engages an end wall 68 of the well 50, or one of the stop elements 66 in the well 50.

The shuttle 64 is configured to be engaged by the piston 36. The shuttle 64 extends between a first end 70 and a second end 72. The first end 70 generally faces the retract spring 42, while the second end 72 generally faces the end wall 68 of the well 50. As shown, the shuttle 64 is in the form of a sleeve that surrounds the guide rod 40, and is slidably moveable along the guide rod 40, including in the bore 60 of the second portion 58 of the piston 36.

The shuttle 64 includes a first flange 74 that is configured to be engaged by the piston 36 when the piston 36 is moved into braking engagement with the brake element 34. For example, and as shown in FIG. 3, the second portion 58 of the piston 36 engages the first flange 74 when the piston 36 is moved into braking engagement with the brake element 34. The first flange 74 is positioned generally adjacent the first end 70 of the shuttle 64, and extends in the radially outward direction. In the embodiment shown, the first flange 74 is in the form of a ring 76 that is positioned in a groove 78 formed in the shuttle 64. Advantageously, the ring 76 may be removably installed in the groove 78, and may be an external-type snap ring. The first flange 74 may extend completely or partially around the outer periphery of the shuttle 64.

Figure 4:
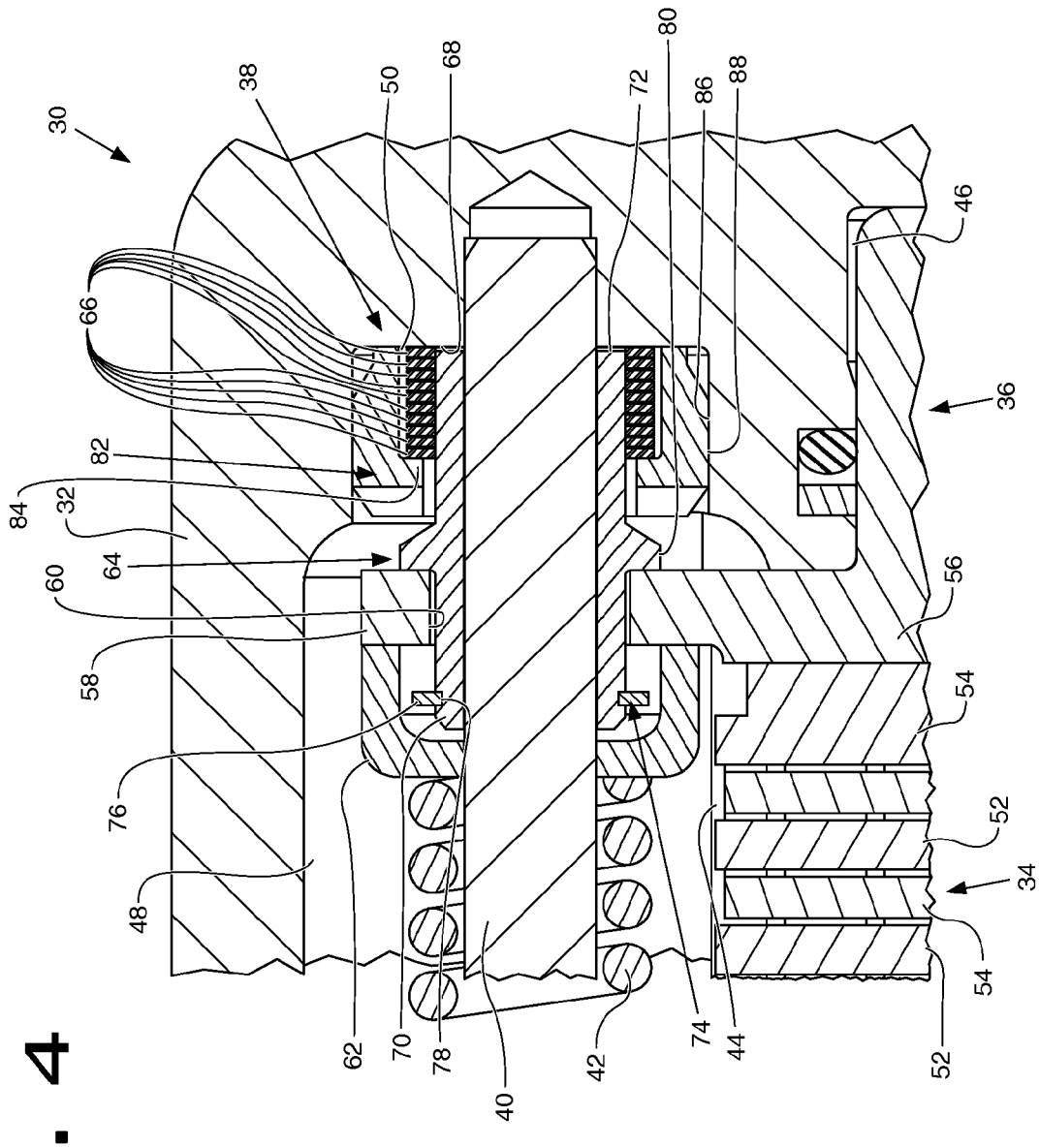
FIG. 4 is a cross-section view like FIG. 3, but with the piston out of braking engagement with the brake element.

The shuttle 64 further includes a second flange 80 that is configured to be engaged by the piston 36 when the piston 36 is moved out of braking engagement with the brake element 34. For example, and as shown in FIG. 4, the second portion 58 of the piston 36 engages the second flange 80 when the piston 36 is moved out of braking engagement with the brake element 34. The second flange 80 is positioned generally between the first end 70 and the second end 72 of the shuttle 64, and extends in the radially outward direction. The second flange 80 may be formed as an integral feature of the shuttle 64. The second flange 80 may extend completely or partially around the outer periphery of the shuttle 64.

The shuttle 64 thereby generally moves when the piston 36 moves. The shuttle 64 may move independently of the piston 36, such as when the second portion 58 of the piston 36 is between the first and second flanges 74, 80.

The slack adjustment mechanism 38 further includes a cap 82 that is configured to be positioned in the well 50. The cap 82 generally surrounds the guide rod 40, the shuttle 64, and the stop elements 66 in the well 50. The cap 82 includes a shoulder 84 that extends in the radially inward direction. The shoulder 84 is configured to move one or more of the stop elements 66 off the shuttle 64 when the piston 36 is moved into braking engagement with the brake element 34. Optionally, the cap 82 may be configured to be removably installed in the well 50. For example, the cap 82 may include a threaded outer portion 86 for threadably engaging a corresponding threaded inner portion 88 of the well 50.

Figure 5A:
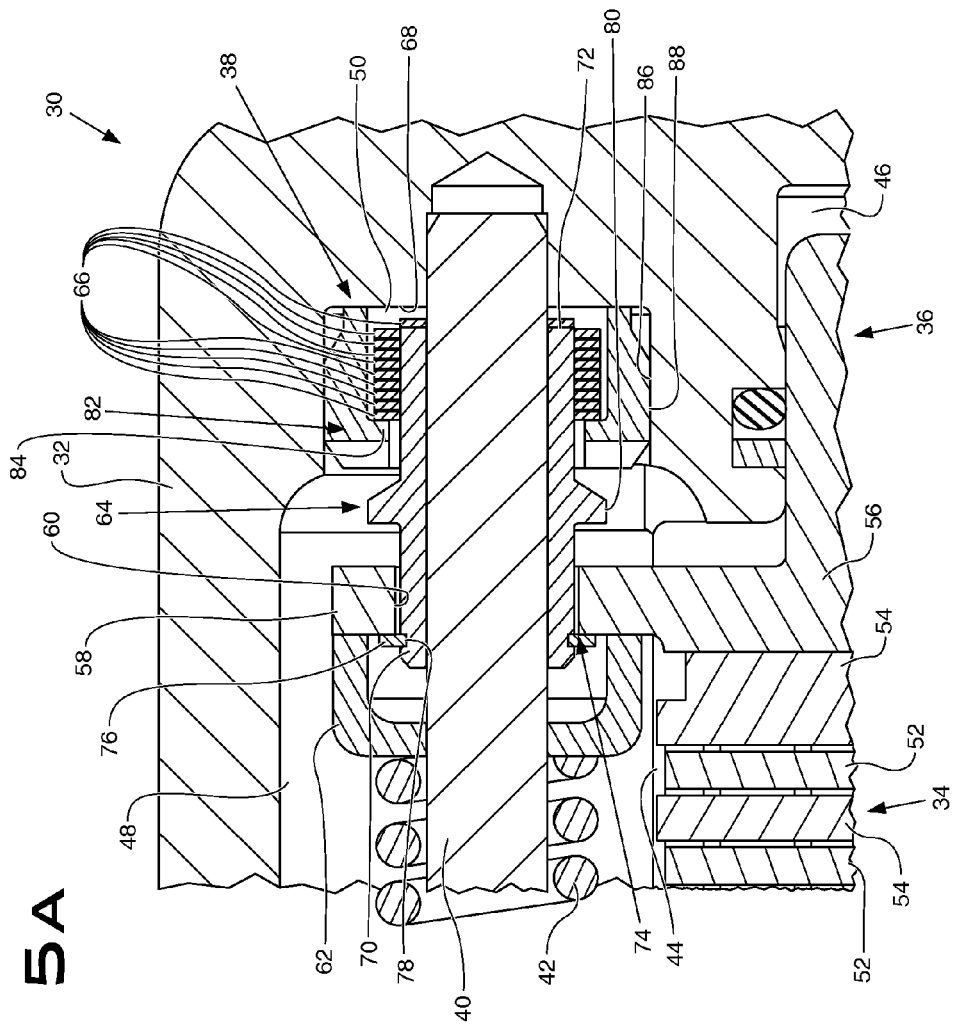
FIG. 5A is a cross-section view like FIG. 3, but with a stop element having been moved off a shuttle of a slack adjustment mechanism.
Figure 5B:
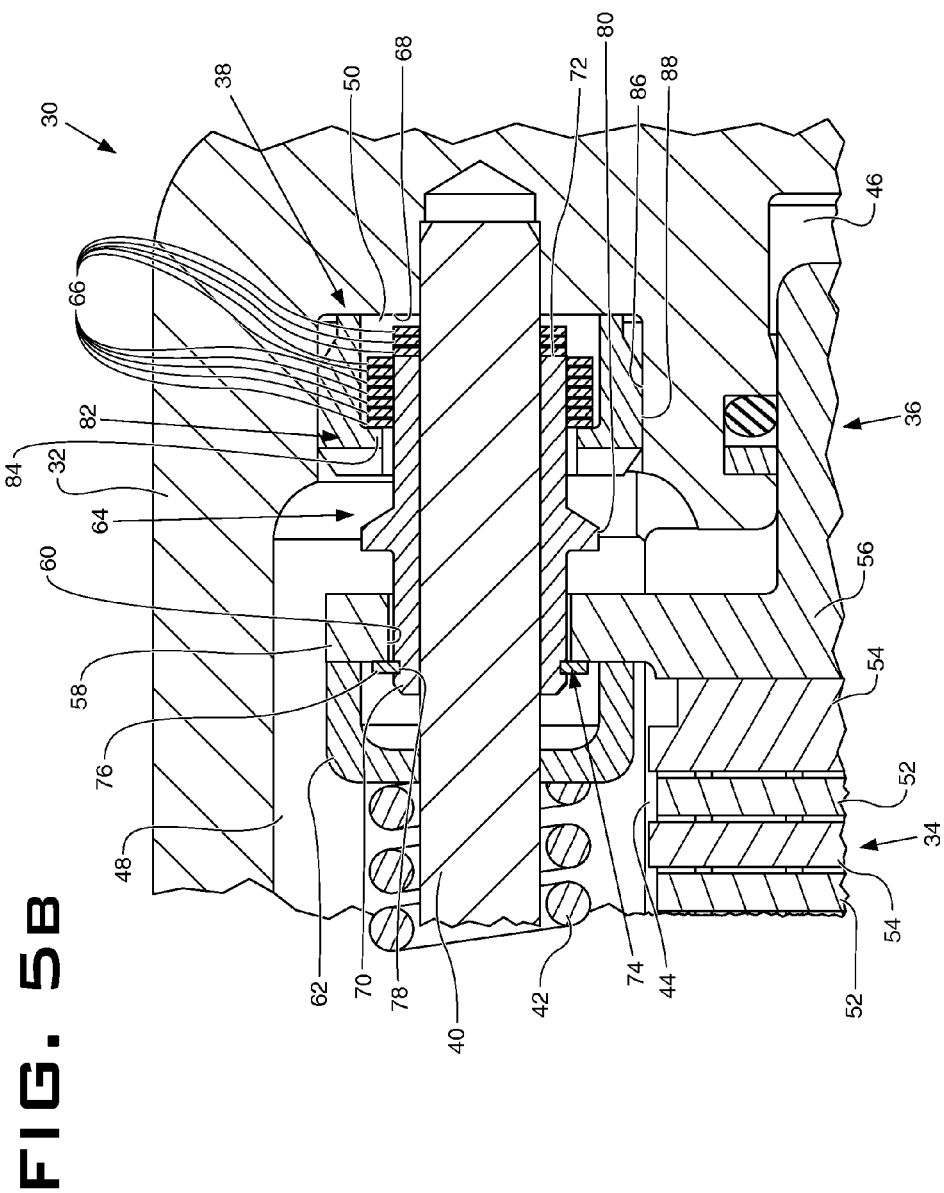
FIG. 5B is a cross-section view like FIG. 5A, but with multiple stop elements having been moved off the shuttle.

Referring next to FIGS. 5A and 5B, when the piston 36 is moved into braking engagement with the brake element 34, the shoulder 84 engages the stop elements 66 carried by the shuttle 64. In particular, the shoulder 84 prevents the stop elements 66 from moving with the shuttle 64. The shoulder 84 engages the stop element 66 nearest the first end 70 of the shuttle 64, and as the shuttle 64 is moved further, one or more of the stop elements 66 near the second end 72 are pushed off the shuttle 64. As shown, the stop elements 66 are moved onto the guide rod 40 in the well 50 when they are moved off the shuttle 64. The number of stop elements 66 that are moved off the shuttle 64 increases as the shuttle 64 is moved further relative to the shoulder 84. For example, FIG. 5A shows one stop element 66 having been moved off the shuttle 64, while FIG. 5B shows three stop elements 66 having been moved off the shuttle 64.

The stop elements 66 may be in the form of rings, such as flexible rings, that surround the shuttle 64 when carried by the shuttle 64, and that surround the guide rod 40 when moved off the shuttle 64. For example, the stop elements 66 may completely or partially surround the shuttle 64 or the guide rod 40. In some embodiments, the stop elements 66 may be in contacting engagement with substantially the entire outer periphery of the shuttle 64 and/or the guide rod 40. The stop elements 66 may be external-type snap rings.

Figure 6:
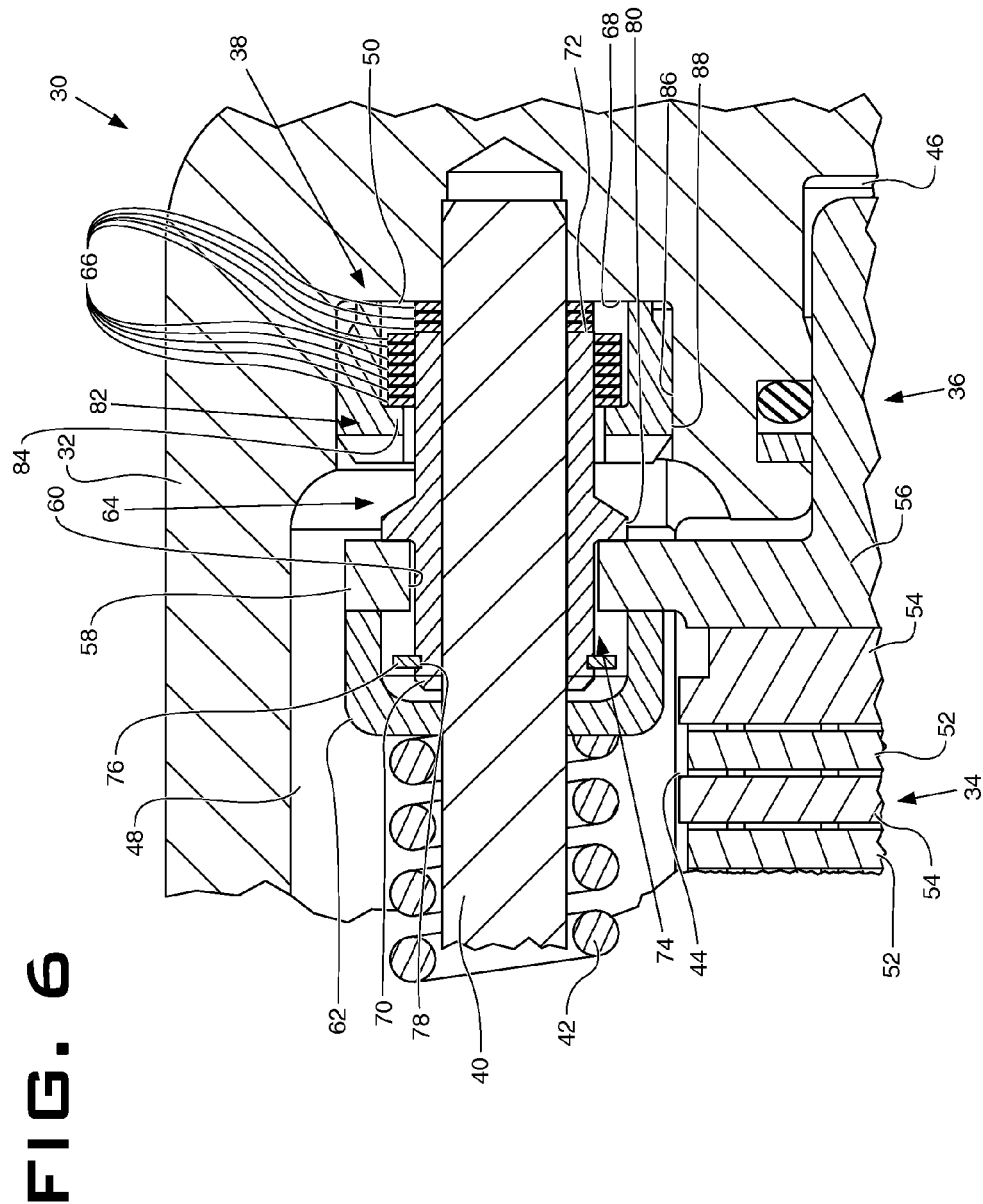
FIG. 6 is a cross-section view like FIG. 4, with movement of the piston stopped when the shuttle engages the stop elements.

Referring next to FIG. 6, when the stop elements 66 are moved onto the guide rod 40, movement of the piston 36 is stopped when the shuttle 64 engages the stop elements 66. The stop elements 66 may be moved into abutting relationship with the end wall 68 of the well 50. For example, and as shown, movement of the piston 36 is stopped when the second portion 58 of the piston 36 engages the second flange 80 of the shuttle 64, and when the second end 72 of the shuttle 64 engages the stop elements 66 in the well 50.

INDUSTRIAL APPLICABILITY

According to the foregoing, a brake assembly 30 is provided having a slack adjustment mechanism 38. The slack adjustment mechanism 38 limits the movement of the piston 36 when the piston 36 is moved out of braking engagement with the brake element 34.

The slack adjustment mechanism 38 includes a shuttle 64 that carries a plurality of stop elements 66. The stop elements 66 are moved off the shuttle 64 as the piston 36 is moved into braking engagement with the brake element 34. The stop elements 66 are moved into the well 50 of the housing 32 of the brake assembly 30.

Advantageously, the slack adjustment mechanism 38 may be prepared as a modular assembly. For example, the cap 82 may be positioned around a portion of the shuttle 64, and the stop elements 66 may be positioned onto the shuttle 64. This assembly of the cap 82, shuttle 64, and stop elements 66 may then be positioned so the cap 82 and stop elements 66 are within the well 50. In addition, the threaded outer portion 86 of the cap 82 may be threadably engaged with the threaded inner portion 88 of the well 50.

What is claimed is:

1. A brake assembly, comprising:
   a housing,
   a brake element configured to be operatively associated with an axle for resisting rotation of the axle,
   a piston configured to be selectively moved into and out of braking engagement with the brake element, and
   a slack adjustment mechanism for limiting movement of the piston when the piston is moved out of braking engagement with the brake element, the slack adjustment mechanism including:
   a shuttle configured to be engaged by the piston,
   a plurality of stop elements carried by the shuttle and configured to be moved off the shuttle into a well of the housing, and
   a cap configured to be positioned in the well and including a shoulder, the shoulder being configured to move one or more of the stop elements off the shuttle when the piston is moved into braking engagement with the brake element, the cap including a threaded outer portion for threadably engaging with a threaded inner portion of the well,
   wherein movement of the piston is stopped when the shuttle engages an end wall of the well or one of the stop elements in the well.

2. The brake assembly of claim 1, the shuttle including a first flange configured to be engaged by the piston when the piston is moved into braking engagement with the brake element, and a second flange configured to be engaged by the piston when the piston is moved out of braking engagement with the brake element.

3. A brake assembly, comprising:
   a housing,
   a brake element configured to be operatively associated with an axle for resisting rotation of the axle,
   a piston configured to be selectively moved into and out of braking engagement with the brake element,
   a guide rod, the piston being moveable along the guide rod, and
   a slack adjustment mechanism for limiting movement of the piston when the piston is moved out of braking engagement with the brake element, the slack adjustment mechanism including:
   a shuttle configured to be engaged by the piston, the shuttle being a sleeve that surrounds the guide rod, and,
   a plurality of stop elements carried by the shuttle and configured to be moved off the shuttle into a well of the housing,
   wherein movement of the piston is stopped when the shuttle engages an end wall of the well or one of the stop elements in the well.

4. The brake assembly of claim 3, the stop elements being configured to be moved off the shuttle and onto the guide rod in the well.

5. The brake assembly of claim 4, each stop element being a flexible ring configured to surround the sleeve when carried by the sleeve and to surround the guide rod when moved off the sleeve.

6. The brake assembly of claim 3, the piston including a first portion configured to engage the brake element and a second portion extending from the first portion and including a bore, the guide rod extending through the bore in the second portion.

7. The brake assembly of claim 6, the sleeve being slidably moveable along the guide rod in the bore.

8. The brake assembly of claim 6, further comprising:
   a retract spring configured to engage the second portion to move the piston out of braking engagement with the brake element.

9. The brake assembly of claim 8, the piston further including an extension member extending from the second portion along a length of the guide rod, the retract spring engaging the extension member distal from the bore.

10. The brake assembly of claim 3, the sleeve including a groove, a ring in the groove, and a flange, the ring being configured to be engaged by the piston when the piston is moved into braking engagement with the brake element, and the flange being configured to be engaged by the piston when the piston is moved out of braking engagement with the brake element.

11. A machine, comprising:
a frame,
an axle operatively connected to the frame and configured to rotate, and
a brake assembly operatively associated with the axle, the brake assembly including:
a housing,
a brake element configured to resist rotation of the axle,
a piston configured to be selectively moved into and out of braking engagement with the brake element,
a guide rod, the piston being moveable along the guide rod, and
a slack adjustment mechanism for limiting movement of the piston when the piston is moved out of braking engagement with the brake element, the slack adjustment mechanism including:
a shuttle configured to be engaged by the piston, the shuttle being a sleeve that surrounds the guide rod,
a plurality of stop elements carried by the shuttle and configured to be moved off the shuttle into a well of the housing, the stop elements being configured to be moved off the shuttle and onto the guide rod in the well, and
a cap positioned in the well and including a shoulder, the shoulder being configured to move one or more of the stop elements off the shuttle when the piston is moved into braking engagement with the brake element,
wherein movement of the piston is stopped when the shuttle engages an end wall of the well or one of the stop elements in the well.

12. The machine of claim 11, each stop element of the brake assembly being a flexible ring configured to surround the sleeve when carried by the sleeve and to surround the guide rod when moved off the sleeve.

13. The machine of claim 11, the piston of the brake assembly including a first portion configured to engage the brake element and a second portion extending from the first portion and including a bore, the guide rod extending through the bore in the second portion and the sleeve being slidably moveable along the guide rod in the bore.

14. The machine of claim 13, further comprising:
a retract spring configured to engage the second portion to move the piston out of braking engagement with the brake element.

15. The machine of claim 11, the sleeve including a groove, a ring in the groove, and a flange, the ring being configured to be engaged by the piston when the piston is moved into braking engagement with the brake element, and the flange being configured to be engaged by the piston when the piston is moved out of braking engagement with the brake element.

* * * * *